United States Patent [19]
Crimmins et al.

[11] Patent Number: 5,917,425
[45] Date of Patent: Jun. 29, 1999

[54] IR/RF LOCATOR

[75] Inventors: James W. Crimmins, Wilton; James L. Saulnier, Newtown, both of Conn.

[73] Assignee: Wireless Communiations Products, LLC, Danbury, Conn.

[21] Appl. No.: 08/999,184

[22] Filed: Dec. 29, 1997

Related U.S. Application Data

[63] Continuation-in-part of application No. 08/551,133, Jan. 22, 1996, abandoned.

[51] Int. Cl.$^6$ ...................................................... G08B 5/00
[52] U.S. Cl. ................................ 340/825.49; 340/825.34; 340/825.36; 340/825.72; 340/539; 340/573.1; 340/573.4; 359/145; 359/152; 359/172
[58] Field of Search ......................... 340/825.49, 825.36, 340/825.72, 825.34, 825.54, 539, 572, 573.1, 573.4; 359/145, 152, 172

[56] References Cited

U.S. PATENT DOCUMENTS

| | | | |
|---|---|---|---|
| 4,727,600 | 2/1988 | Emik Avakian | 359/172 |
| 4,990,892 | 2/1991 | Guest et al. | 340/573 |
| 5,062,151 | 10/1991 | Shipley | 359/154 |
| 5,103,108 | 4/1992 | Crimmins | 250/338.1 |
| 5,153,584 | 10/1992 | Engira | 340/870.18 |
| 5,204,687 | 4/1993 | Elliott et al. | 343/702 |
| 5,239,296 | 8/1993 | Jenkins | 340/936 |
| 5,268,734 | 12/1993 | Parker et al. | 356/139.06 |
| 5,301,353 | 4/1994 | Borras et al. | 455/9 |
| 5,317,309 | 5/1994 | Vercellotti et al. | 340/825.54 |
| 5,479,408 | 12/1995 | Will | 370/94.1 |
| 5,627,524 | 5/1997 | Frederickson et al. | 340/825.07 |
| 5,689,229 | 11/1997 | Chaco et al. | 340/573.1 |

*Primary Examiner*—Brian Zimmerman
*Assistant Examiner*—Yves Dalencourt
*Attorney, Agent, or Firm*—St. Onge Steward Johnston & Reens LLC

[57] ABSTRACT

An infrared (IR) article or person locator system is described wherein a plurality of stationary units are distributed in zones throughout an enclosure. The article or person carries a portable device so that the infrared communication link can derive local information as to where the article or person is and an RF link is used, instead of cables, to transfer the local information to a central processor or station. In one embodiment local stationary beacons generate location codes at an IR carrier frequency and IR portable devices carry transceivers made of an IR receiver and a portable RF transmitter transmits the location code and a PIN code associated with the portable device to the central station. Techniques are described for reducing electrical power demands on the portable device's battery while enhancing the speed with which the central station can be alerted of a change in the location of the portable device.

22 Claims, 7 Drawing Sheets

IR/RF LOCATOR

PRIOR APPLICATION

This application is a continuation in part of U.S. patent application Ser. No. 08/551,133, filed Jan. 22, 1996, entitled IR/RF Locator by James W. Crimmins and James Saulnier and assigned to the same assignee as for this application now abandoned.

FIELD OF THE INVENTION

This invention relates to a method and apparatus for locating a device or person inside an enclosure such as an office building, hospital or factory and the like. More specifically this invention relates to an apparatus for the determination of the location of a person or device inside a building using infrared and radio frequency (rf) signals.

BACKGROUND OF THE INVENTION

In U.S. Pat. Nos. 4,275,385 and 5,103,108 infrared communication systems are described wherein a person or device carries a portable infrared transceiver with which signals can be relayed via ceiling located modules. This infrared communication technique has been extended so that a central locating facility can determine the location of the portable infrared transceiver, see for example U.S. Pat. No. 5,319,191. This is done by placing an infrared communicator in each room of an enclosure and providing suitable cabling from each room located module to a central control facility. The latter may then determine from the code signals from the portable infrared device where the person or apparatus is located.

A problem with such infrared communication system is that each of the room located infrared modules needs to be connected by cable to a central control. The cabling is expensive to install and available cabling is not always suitable for communication at the desired transmission rate. The cabling costs can constitute between 30 to 60 percent of the costs for an entire infrared communication system.

Another problem is found to arise in areas where a multiple of fixed IR units are used. In such a situation a portable device may be reported to be in more than one area at a time by different responding fixed IR units. To resolve such ambiguity, the infrared signal strength is measured and reported along with the identification codes to enable a central processor to determine the most likely location for the portable device. To enable a reliable determination of the location or when a portable device has left an area, an impracticably accurate (i.e. +/−1 db) logarithmic signal strength measurement is required. Such measurements impose expensive hardware requirements, which in the face of the high cabling costs for the wiring of the fixed IR units drive the price of an IR locator system too high for many applications.

When an IR locator system employs a regularly transmitting IR portable badge to a fixed IR receiving unit, frequent location updates, of the order of 20 times a minute, are needed to keep track of the IR portable device. Such updates determine the time before one can note that a person or apparatus bearing the badge has changed location. Since, several seconds for such determination can be too long, an increase in the transmission rate would be needed. In such case, however, the drain on the portable device's battery increases and its corresponding useful life or recharge interval is unacceptably reduced. One can increase the battery size, but this also represents an undesirable expense and an overly heavy badge.

RF devices for locating and monitoring people are described in U.S. Pat. Nos. 4,598,275; 4,814,751; 5,153,584; and 5,317,309. Such systems tend to propagate through walls of a room so that the precise room location of a person is not always available. Such RF systems are prone to interference from extraneous sources and from other users at the same frequencies.

These shortcomings of the prior art IR locator systems are avoided with an IR locator system in accordance with the invention.

SUMMARY OF THE INVENTION

With a communication system in accordance with the invention, advantages of infrared and RF communications are advantageously combined to provide an accurate and convenient-to-install person or apparatus locator. This is achieved, as described for one embodiment in accordance with the invention, by providing portable transceivers which have infrared receivers and RF transmitters. The portable transceivers receive infrared location coded signals from enclosure or room located infrared transmitters and retransmit these at RF carrier frequencies to a central unit after combining the location coded signals with personal identification number (PIN) signals. These PIN signals are assigned to the person or apparatus whose location in a building is to be monitored.

With a communication system in accordance with the invention reliance upon the need for cabling is advantageously eliminated and reliable communication is obtained. The stationary infrared transmitters are distributed throughout a building to regularly transmit an infrared location coded signal that is prearranged to identify a particular zone or room. The portable transceivers detect IR location signals from the respective stationary IR transmitters, combine location codes with the portable's PIN number and as necessary, retransmit these at an RF carrier frequency to a central unit. The RF transmission is done in either repeated short bursts or with low duty cycles, and preferably with random spacing in time, so that a plurality of portable transceivers can utilize the same carrier frequency even when at times the RF transmissions from the portable transceiver may occur at the same time.

As described herein for one embodiment in accordance with the invention a unique rapid and sensitive technique for determining changes in location of a portable IR transceiver device is provided. This is obtained by utilizing fixed IR beacons which transmit IR location signals at a continuously active and common IR carrier frequency. A portable IR receiver is used with an FM receiver section, having the usual FM characteristics. Hence, the IR FM receiver captures and responds to the strongest IR beacon signal whenever several beacon signals are simultaneously incident upon the portable IR receiver. With such an IR receiver, vastly improved discrimination between different IR beacon signals is obtained so that the most likely location of a portable IR device can be much more accurately and cost effectively determined.

Since the use of a portable transceiver having an IR receiver section and an RF transmitter tends to demand a relatively high amount of battery power, if the RF transmission is to be transmitted at regular short intervals, a preferred technique is used to limit RF transmission to those occasions when they are needed. For example, in one technique in accordance with the invention the continued presence of an IR portable device at the same location is sensed and as long as this continues an RF transmission is not needed. When a change in location occurs and this is sensed by RF transmission control circuitry inside the IR portable device, an RF transmission of the new location is made.

Because the IR transmitter is stationary and has access to much more power than the conventional "IR transmitting portable" approach, it is possible to have it transmit a continuous FM stream of repeating data packets containing the location code. These packets can repeat every few milliseconds. Such an arrangement offers great advantages for the portables: First, each portable can be programmed to review its location as often as is desired for that application. A portable attached to a piece of equipment for example may be programmed to review its location only once a minute thus saving battery power. A portable on a fast moving fork lift truck may be programmed to review its location every tenth of a second. The stationary IR transmitter is unchanged for both applications. Secondly, because there is no need to wait for an IR location packet, a great deal of battery drain is conserved because the portable can wake up, energize its receiver, read its location, decide whether to transmit an RF burst and go back to a timed sleep all within a few milliseconds. Doing this, it is possible to reduce battery current to a fraction of what is currently required.

Because the proposed architecture uses a stationary IR transmitter and a portable RF link to the central equipment, it is uniquely advantageous for incorporation in indoor wireless PBX systems having RF handsets. In this case the required RF update packet transmission is accomplished as part of the handset's normal RF handshaking with the system and the controller function is incorporated in the handset's controller. Only a miniature IR receiver needs to be added.

It is, therefore, an object of the invention to provide a reliable IR locator system which can be provided at reasonable costs and provides accurate and timely locating capability and can be operated with extended battery life for the IR portable device.

It is, a further object of the invention to provide a method and system for determining the location of a person or apparatus within a building without requiring an expensive cumbersome installation of additional communication cables to each of a plurality of individual zones in the building.

These and other advantages and objects of the invention can be understood from the following description of several illustrative embodiments in accordance with the invention as shown in the drawings.

DETAILED DESCRIPTION OF DRAWINGS

Figure 1:
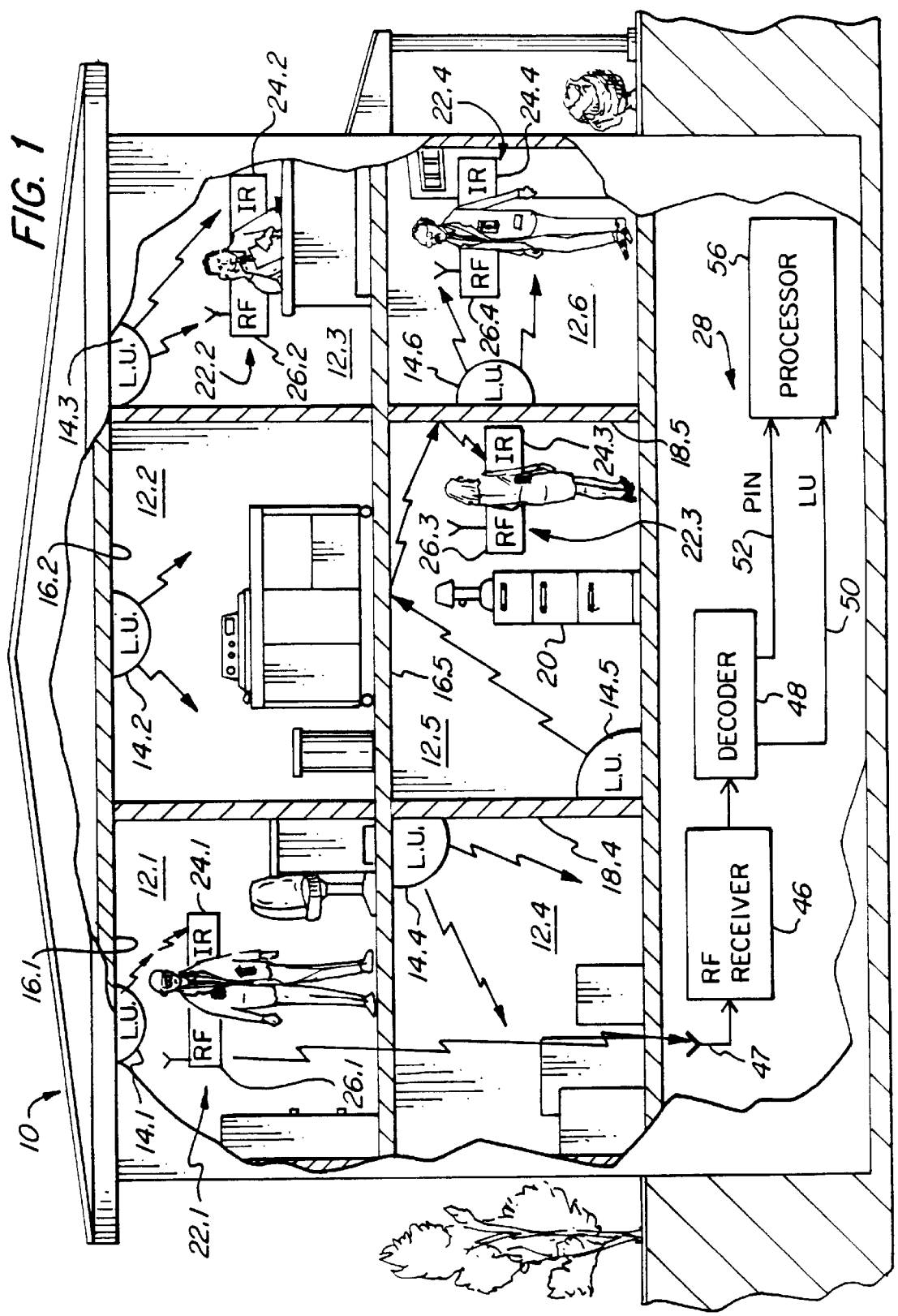
FIG. 1 is a schematic representation of a building in which a locating system in accordance with the invention is installed.

In FIG. 1 a building 10 is illustrated having a plurality of separate zones 12, which typically coincide with the individual rooms or zones within the building 10. The use of decimals after numbers signify like items but at different locations. Each of the rooms 12 is provided with an infrared transmitter 14, identified as, a beacon signal generating local unit (L.U.), and which typically sends out very short bursts of infrared (IR) location signals at regular intervals. The intervals are preferably randomly selected by setting appropriate components during the manufacture of the transmitters 14.

The IR transmitters 14 may be mounted from the ceilings 16 or on the walls 18 of the rooms or mounted at an ac receptacle as in zone 12.5. The IR transmitters can be battery powered or when mounted at ac receptacles be activated from available ac power. When an IR transmitter 14 is located at a low room level as shown in room 12.5 and a large obstruction such as 20 is nearby, IR communication is still possible by virtue of IR reflections from a ceiling 16.5 and/or a wall as shown for room 12.5.

Each IR transmitter beacon 14 sends out a unique IR ID (identification) signal from a memory store and which can be identified at a central control as originating from a particular zone or room 12, FIG. 1. The IR location or ID signals may, for example, be transmitted at an IR carrier frequency that is typically above 400 KHz so as to avoid signal interference from fluorescent lamps and be in the form of bursts of the order of about 3 milliseconds long at intervals of once every 5 seconds. Different burst durations and repetition intervals can be accommodated.

Portable transceivers 22, or badges as they are sometimes called, are provided for persons or apparatuses. These transceivers each include an IR receiver 24 and an RF transmitter 26 which are coupled to each other. Hence, RF transmitters 26 can re-transmit received IR location signals at an RF carrier frequency to a remote central control system 28. These transmissions do not always have to occur at the rate that IR location code signals are received if the resulting RF transmissions from multiple RF transmitters creates interference problems.

Figure 2:
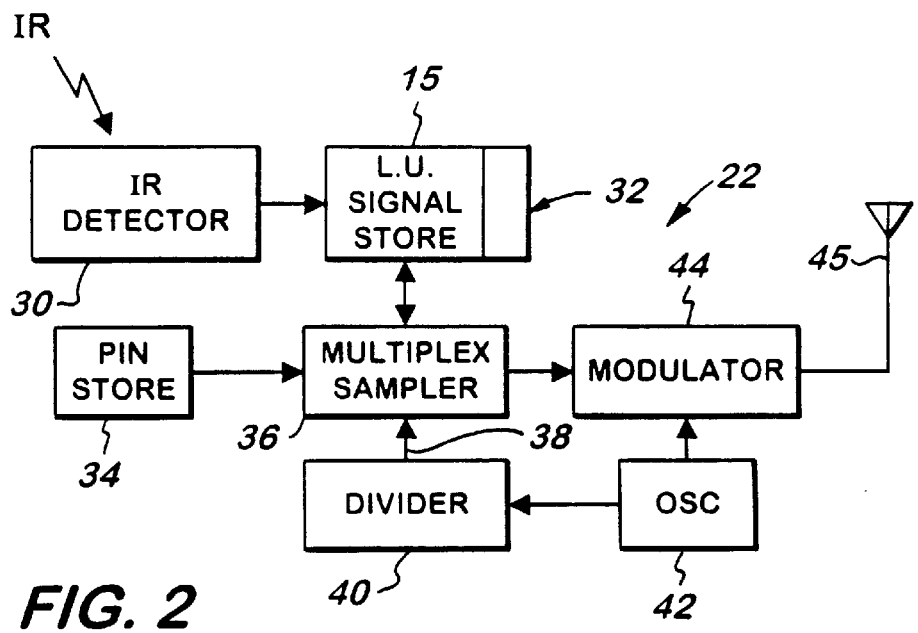
FIG. 2 is a block diagram view of a portable transceiver and locating system in accordance with the invention for use in the system shown in FIG. 1.
Figure 4:
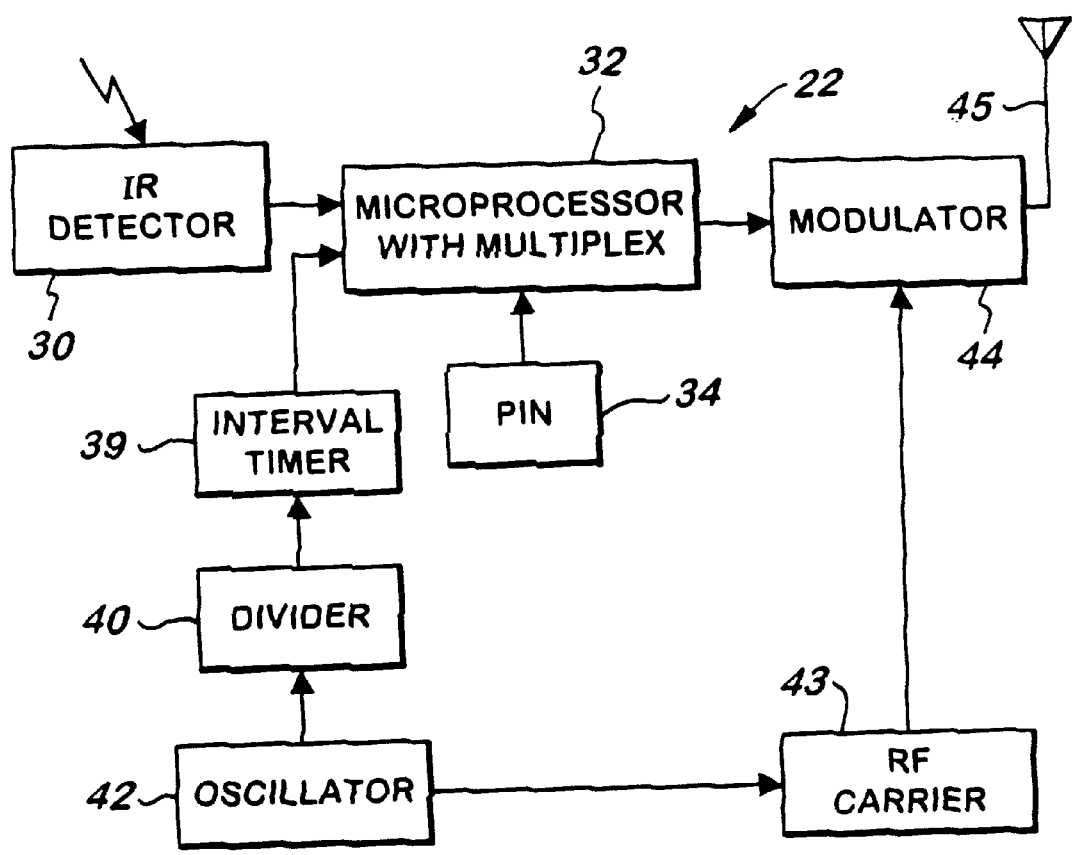
FIG. 4 is a more detailed block diagram view of a portable system in accordance with the invention.

As shown in FIGS. 2 and 4 each portable transceiver 22 includes an IR detector which detects the infrared location or ID signals from the various IR stationary transmitters 14 and temporarily stores the detected location code in a memory 15 of a microprocessor 32. A personal identification number, a PIN, associated with a particular person or equipment, is stored in a memory 34 for as long as the person or equipment is associated with the particular transceiver 22.

A multiplexer, which can be a part of the signal processor 32, is activated at predetermined intervals by a pulse on a line 38 from an interval timer 39. The timer is activated by pulses from a divider network 40 driven by a signal from an oscillator 42. The microprocessor 32 transfers the location code detected by the IR detector 30 and the PIN signal from memory 34 in sequence to a modulator 44 to modulate an RF carrier signal obtained from a carrier signal generator 43 driven by oscillator 42.

The modulated carrier signal is transmitted by an antenna 45 to an antenna 47 of an RF receiver 46 in the central control station 28, see FIG. 1. The output from receiver 46 is decoded by a decoding network 48 to reproduce the location signal on line 50 and the personal identification signal on line 52. These signals are associated with each other and so used in the signal processor 56 to determine where a particular person or piece of equipment is located.

Figure 3:
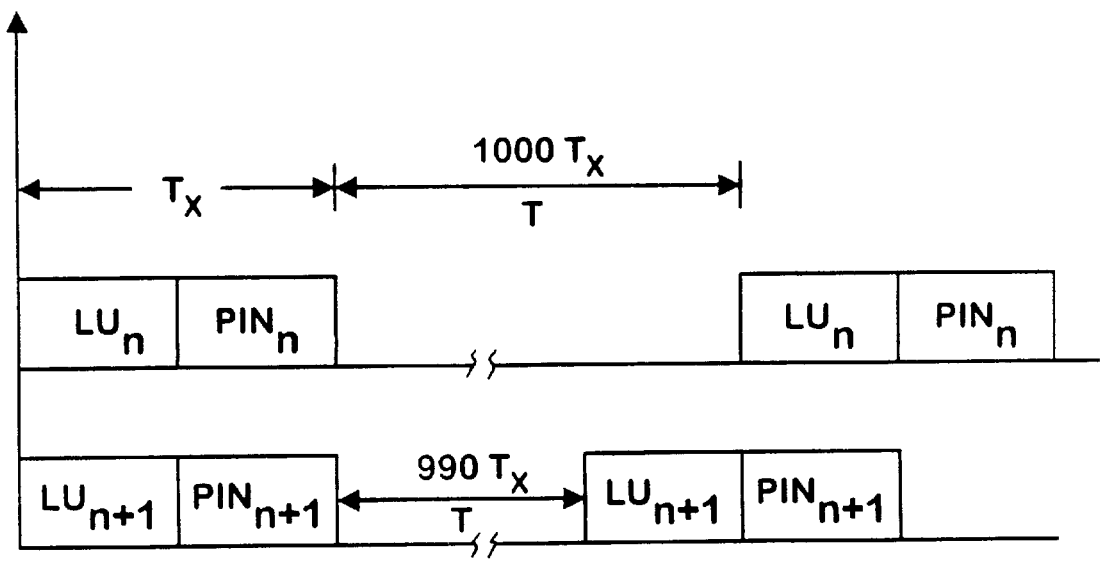
FIG. 3 is a timing diagram of RF transmission bursts from several transceivers in accordance with the invention to illustrate a minimization of signal interference.

In the system of FIGS. 1 and 2 the bursts of RF transmissions from a transceiver occur as shown in FIG. 3 separated by intervals T. It should be understood, however, that the portable devices can do either such store and forwarding or immediately transmit received IR local zone codes followed by PIN codes. The intervals T are preferably slightly different for each transceiver 22 so that in the aggregate relatively few instances of interference from simultaneously transmitted bursts occur. For example, if the duration of a burst is designated as $T_x$ and the time between bursts is for example $10,000T_x$ then for different transceivers 22 different repetition rates are employed such as $9,990T_x$ $9,970T_x$ etc. In this manner the chances for any one transmission to step on that from another transceiver is reduced to a very low level even when a substantial number of transceivers 22 are employed at one facility 10.

With an IR/RF locator system in accordance with the invention the wiring of the various IR transmitters 14 to a central control can be avoided. The common RF frequency employed can be designated particularly for the facility 10 and interference from other RF sources minimized with appropriate isolation techniques.

Having thus described several embodiments of the invention its advantages can be appreciated. Variations from the described embodiments can be made without departing from the scope of the invention. For example, the embodiment described herein for FIGS. 1–4 employed portable systems formed of an RF transmitter and an IR receiver and a stationary IR location transmitter. This arrangement can be reversed whereby the portable unit 22 is formed of an IR PIN code transmitter only and the stationary local unit 14 has an IR receiver such as 24 and an RF transmitter such as 26. The portable unit 22 then transmits its PIN code at regular intervals, and the stationary unit 14 receives and detects this PIN code and transmits this with its stored location or ID code to the base system 28 using RF.

Figure 5:
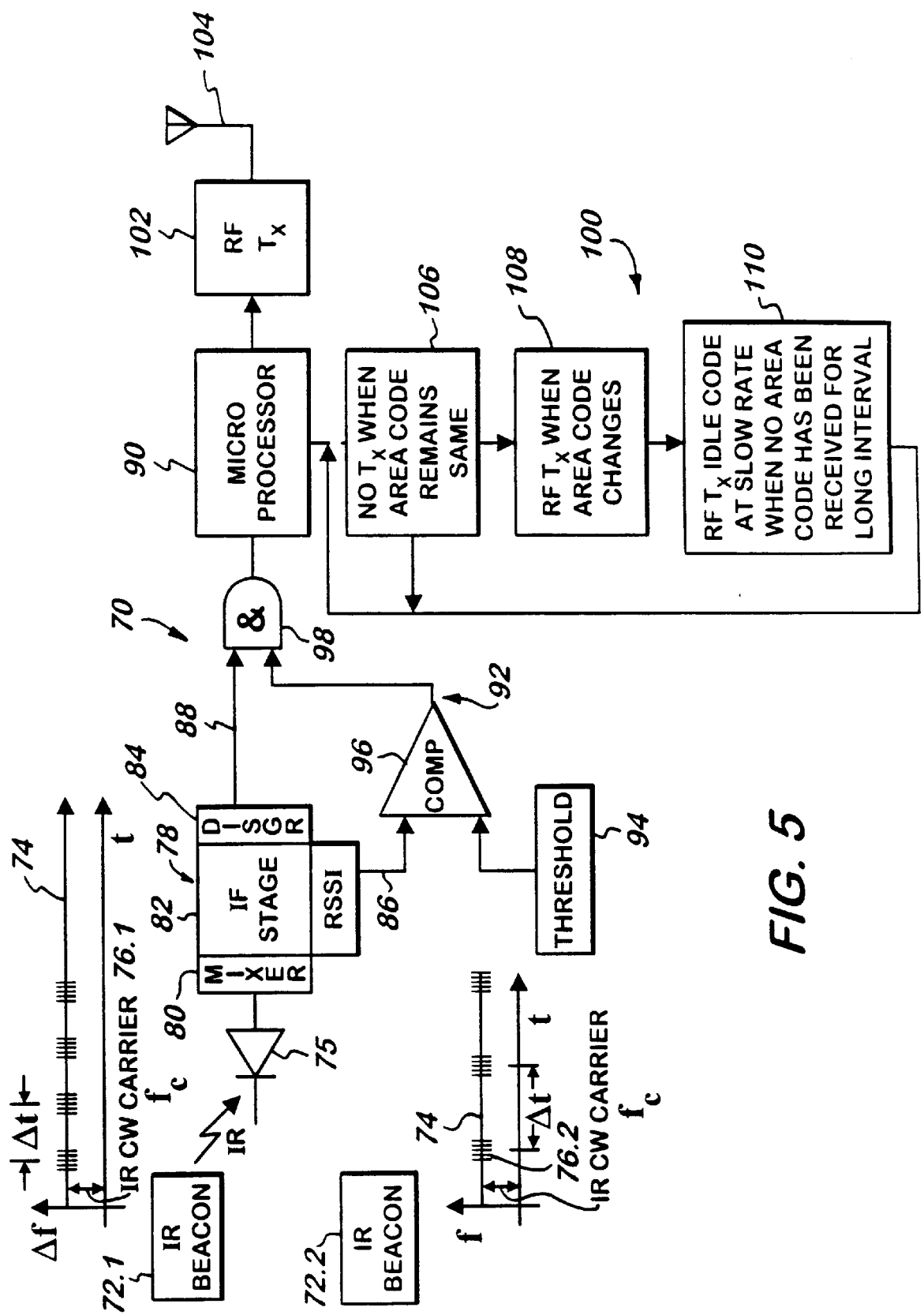
FIG. 5 is a schematic block diagram of still another embodiment in accordance of the invention.

In the embodiment illustrated in FIG. 5 portable IR transceivers 70 are used as portable badges or devices and communicate with fixed IR beacons 72 located in a manner as previously described in connection with FIG. 1. The IR beacons 72 transmit using a common IR carrier as illustrated at 74 with a location code 76 FM modulating the carrier 74. Other signals can of course also be transmitted by the beacons 72 to portable devices 70. The IR beacons' repetition intervals preferably are smaller, of the order of several times a second.

The IR portable device 70 detects the IR and FM modulated carrier 74 with an appropriate photo diode 75 sensitive to the IR radiation and in a manner as is well known in the art. The detected carrier is converted to an electrical FM carrier signal which is demodulated in an FM receiver section 78, which has a mixer stage 80, an IF (intermediate frequency) stage 82 using standard FM circuitry and a standard discriminator stage 84. The standard IF stage produces an RSSI signal on an output line 86, which signal in turn is representative of the amplitude of the IR carrier at the input to the photo diode 75 of the IR portable device 70.

The FM signal is detected with a standard discriminator, which detects the location code 76 and applies this onto an output line 88 together with such error correction coding (CRC) as may be used to enhance the correct detection of the location code by a microprocessor 90 in portable device 70.

The FM receiver section 78 has the well known capture effect whereby weaker interfering signals are suppressed and the larger signal preferentially selected. As a result, when an IR portable device 70 receives beacon signals from different beacons 72.1 and 72.2, the beacon signal that is larger tends to be selected and with an effectiveness that depends upon the capture ratio for the FM receiver stage 82. Since the capture ratio can be substantial, a small IR signal amplitude difference, such as caused by the movement away from one beacon 72.1 and closer to another such as 72.2, can be detected as a change in location of the IR portable device. Hence, a more sensitive response to position changes can be obtained and a more reliable reporting of a new location can be made to a central signal processor such as 56 shown in FIG. 1. The FM receiver section 78, therefore , has a sufficient capture ratio so as to optimize the FM receiver's capability in isolating and selecting the stronger of the infrared signals from different infrared transmitters.

Another aspect of the IR transceiver device 70 of this invention involves a reliable detection of the beacon signals 76. This can be done with the use of a squelch circuit 92 or with the use of an adequate amount of error correction coding or a combination of both. In the embodiment of FIG. 5 the squelch circuit 92 includes a threshold generator 94 which applies a signal, indicative of a minimum desired level of the IR signal at the photo detector 75, to a comparator 96. This compares the threshold signal with the RSSI signal on line 86 to control enablement of an AND gate 98 interposed between the output on line 88 of receiver 78 and the microprocessor 90.

Once the IR signal incident on diode 75 is sufficiently large to overcome the squelch signal threshold level and AND gate 98 has been enabled, the received signal burst from a beacon is entered into microprocessor 90. This then enters an RF transmission control routine 100 to analyze the received location code 76 and, when a change in location is sensed, it produces an output signal for RF transmission via transmitter 102 and RF antenna 104 to the central processor 56, see FIG. 1. The RF transmission includes at least the new beacon location code and the PIN signal identifying the particular IR portable device which sensed a change in location.

The RF transmission control routine 100 provides for a technique to determine when a change in location is to be transmitted as well as recognize a need to transmit a signal when no beacon signal has been received for a predetermined time. The routine 100 begins at 106 by monitoring the strongest beacon signal and as long as this remains the same, refrains from sending an RF signal burst. Then, when at 108 a change in beacon signals is sensed, an RF transmission is made occur. In the event no beacon signal has been received for a long time a special idle code indicative of this condition is generated by the processor 90 and transmitted via RF to the central processor with the PIN code at 110 in the routine 100. This idle code is transmitted at a slow rate, i.e. with long intervals between transmissions, for as long as a beacon signal is not being received and provided the IR portable device is on.

Figure 6:
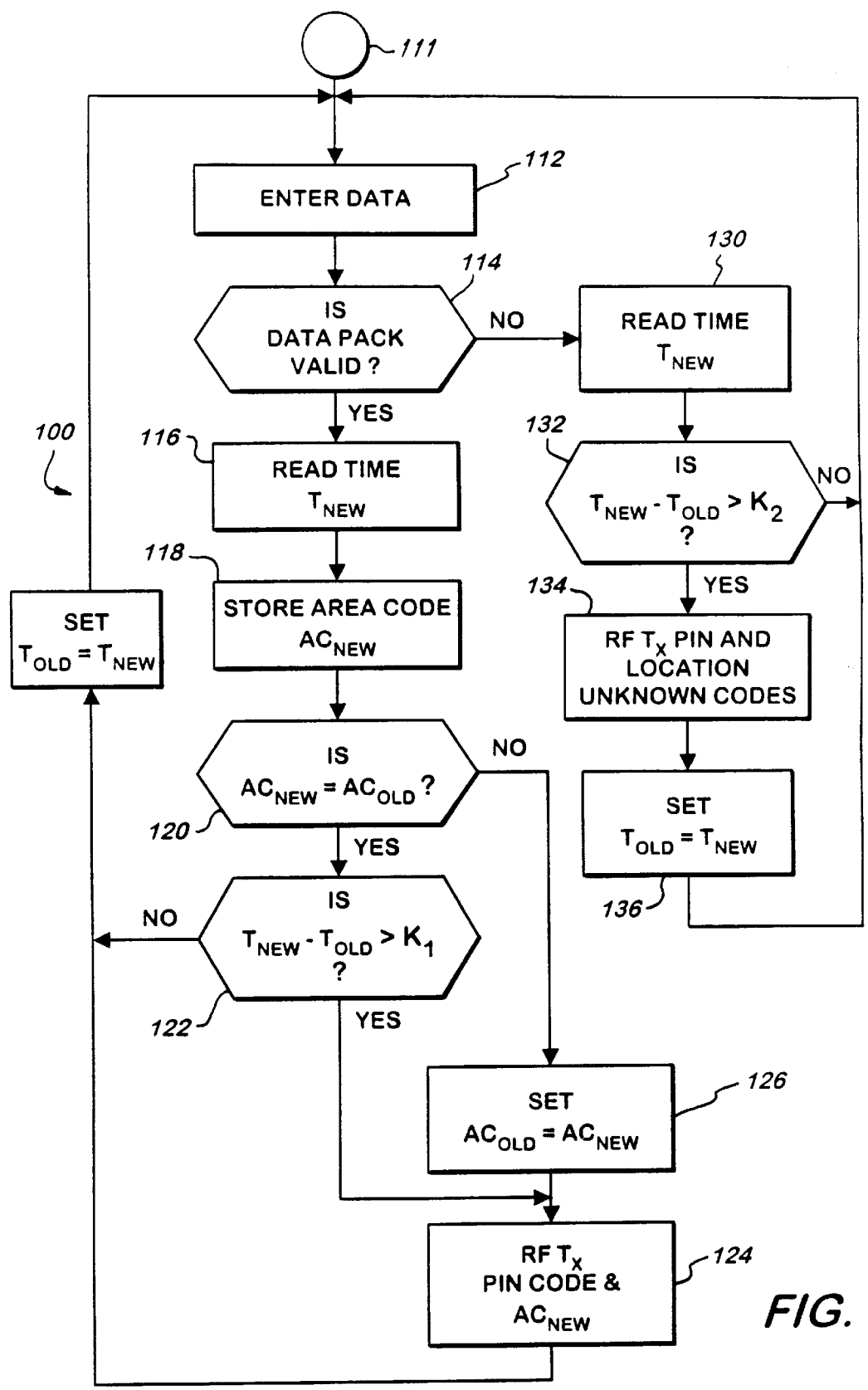
FIG. 6 is a flow chart illustrating one example for the operation of a microprocessor used in an IR portable device of this invention.

FIG. 6 illustrates with more detail illustrative steps involved in the routine 100 for a microprocessor 90. At 111 registers and variables are initialized. At 112 data from the FM receiver, or such other receiver as may be used by the IR portable device, is entered, using standard techniques, into the processor 90. Entered data is then examined for validity at 114. This typically involves using an error correction code appended to the transmission from a beacon 72. The CRC's length determines how rigorous the validity examination is and if sufficiently long can be relied upon to delete any squelch circuitry such as 92.

If the data is deemed to be valid, a timer is read at 116 and stored in a location identified as $T_{new}$ together with the area code defined by the beacon's location code and stored as $AC_{new}$ at 118. A test is made at 120 whether there has been a change in area location by the IR portable device as indicated by a change in the beacon signal's location code. This test is done by comparing the just received location code $AC_{new}$ with a previously stored location code $AC_{old}$ at 120. If there has been no change in the location code a test is made at 122 whether the elapsed time between $T_{new}$ and $T_{old}$, representative of a previous time, exceeds a maximum duration $K_1$. If not, a return is made to step 112 to await the next beacon signal. If so, then at 124 an RF transmission is sent to the central processor 56 of the IR portable device's PIN code and the new location code $AC_{new}$.

In the event the test at 120 indicated that there was a change in the sensed location code, then after setting $AC_{old} = AC_{new}$ at 126, the IR portable device's PIN code and the new location code $AC_{new}$ are sent at 124 and a return is made to step 112 to await the next beacon signal detection.

Since it is possible that for some reason there is no reception of a beacon signal, for example if the IR portable device is in a closet or bath room, a need exists to recognize this condition. This is done whenever the validity test at 114 does not identify valid data or whenever a particular time interval has been exceeded. Hence, at 130, in response to not finding valid data at 114, a timer is read and stored as $T_{new}$ and a test is done at 132 whether the interval since the last valid beacon signal was received exceeds a particular maximum $K_2$. If not a return is made to step 112 and if so, an RF transmission is made at 134 of the IR portable device's PIN code and a "location-unknown" code. This "location-unknown" code can be such code as identifies the fact that no IR location code signal has been received by the particular IR portable device for a predetermined interval. A return is then made to step 112 after setting $T_{new}$ equal to a value $T_{old}$ at 136.

With the routine 100 as set forth in FIG. 6, RF transmissions are significantly reduced because there is no need to transmit current location codes to the central processor at regular intervals. Transmissions are only made when needed. As a result the battery life of the IR portable device is increased, transmission spectrum is preserved and RF transmissions from different IR portable devices are less likely to step on each other resulting in a more reliable RF communication.

Further battery power conservation can be obtained by implementing an idle mode. For example, the beacons 72 may be transmitting an IR location code rapidly separated by short intervals. This would enable an IR portable device to more quickly determine when there has been a change in location. For some IR portable devices 70 such rapid analysis of beacon signals may not be needed and battery power conserved by de-powering part of the circuit used to detect IR beacon signals and activating the idled circuit at certain intervals for certain time periods.

Figure 7:
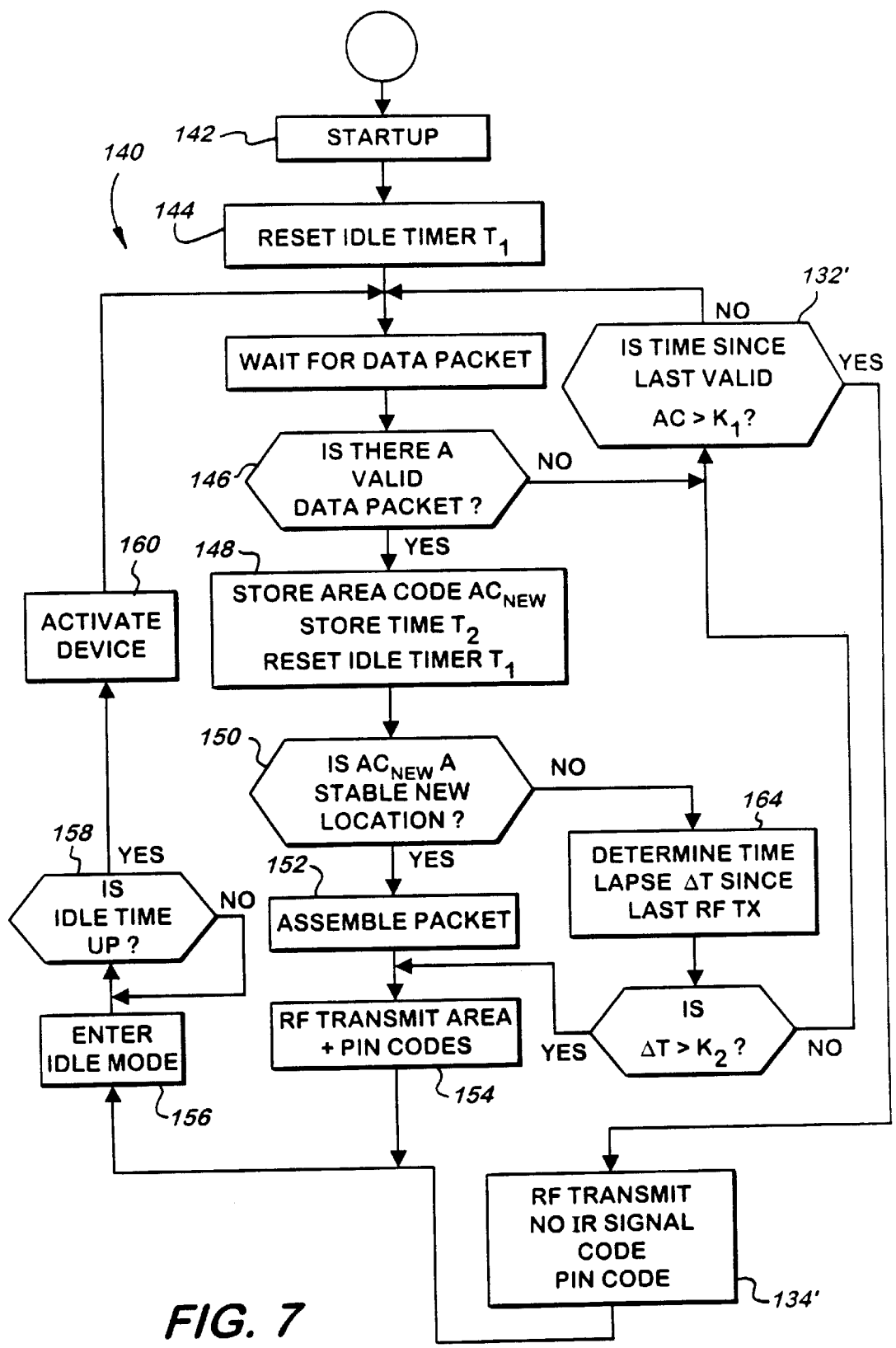
FIG. 7 is a more detailed flow chart illustrating additional steps used in a program for operating a microprocessor used in an IR portable device in accordance with the invention.

FIG. 7 illustrates an example for a routine 140 incorporating an idle interval. After start up at 142, involving an initializing of registers and variables, an idle timer $T_1$ is set at 144. A test is then entered at 146 whether received beacon signals represent valid data, and, if so, the location code is stored at 148 as $AC_{new}$ together with time time $T_2$. The idle time is again reset and a test is entered at 150 as to whether the location is new or different. If new, an RF transmission of the location code and PIN code is made at 152 after assembling the data packet to be transmitted at 154. An idle mode is then entered at 156. This mode de-powers the IR portable device, except for its timer, for a certain interval. At 158 the idle timer is monitored to determine whether the idle interval has expired. If so the portable device is activated at 160 and a return made to step 146.

Other steps in routine 140 include similar steps as described in connection with FIG. 6 as suggested with the use of primed similar numbers. In addition a special timer controlled test is conducted at 164 as to whether there has been an excessive time lapse since the last RF transmission of a location code.

Figure 8:
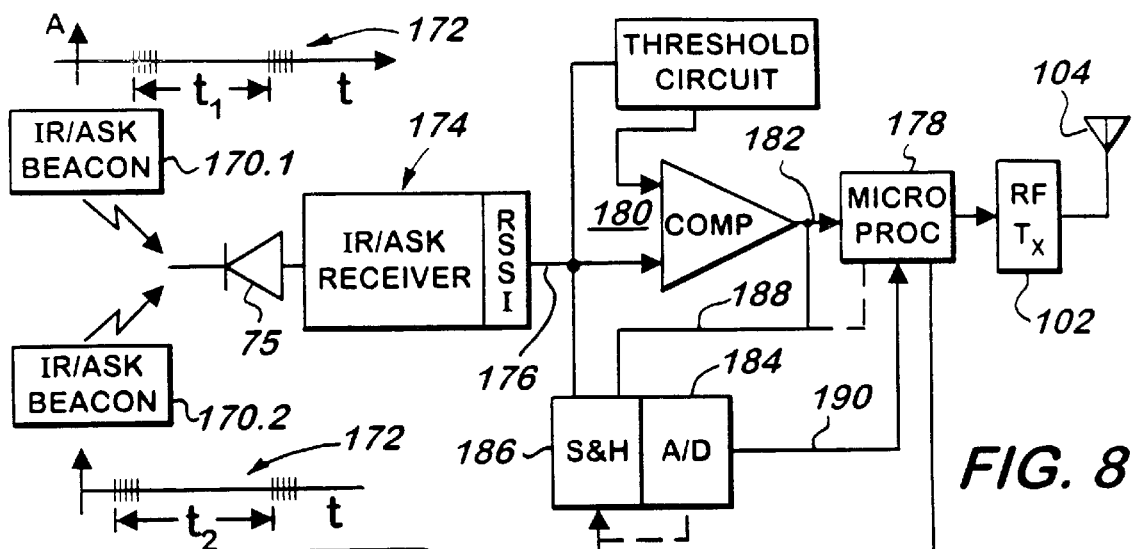
FIG. 8 is a block diagram view of a portable IR transceiver in accordance with the invention and using an ASK IR transmission technique.

The techniques in FIGS. 6 and 7 have been described in connection with the use of an FM receiver. It should be understood, however, that this invention can be achieved using an ASK (amplitude shift keyed) transmission. FIG. 8 illustrates such a technique. The IR beacons 170 transmit ones and zeroes as amplitude shifts as illustrated at 172. The photo diode 75 is used to detect the IR signals and produces electrical outputs indicative of the detected IR signals. An ASK receiver 174 is used and can be of the type as described in U.S. Pat. No. 5,319,191 and owned by the same assignee as this invention. This '191 patent is incorporated herein by reference thereto.

The RSSI output line 176 from the receiver 174 is applied to a microprocessor 178, through a squelch circuit 180. It should be understood, however, that such squelch circuit can be dispensed with, particularly when an adequate amount of error correction coding is incorporated with the beacon transmissions. The microprocessor is programmed to contain a routine for controlling and determining the location of an IR portable device using the ASK type signals from the beacons 170.

When data is passed through the squelch circuit 180 at line 182, the data is entered into the microprocessor 178 by way of a suitable interrupt. At the same time a measurement of the incoming IR signals is made with an A/D converter 184. This includes a sample and hold type network 186 which is activated by a strobe signal derived from the first one or several bits in the data stream from the received beacon signal as suggested by the line 188. AID converter 184 could be an integral part of the microprocessor 178 or a separate circuit.

The digital output of the A/D converter 184 is applied along line or lines 190 to the microprocessor 178 which then stores and can use a digital signal, S, representative of the magnitude of the IR beacon signal incident on the photo diode 75. Storage can be in a temporary register or other memory. An output line 192 from the microprocessor 178 can be used to dump the analog stored signal in the sample and hold circuit 186 or alternatively this can be automatically dumped by the A/D converter to prepare it for the next conversion. The microprocessor 178 has an output coupled to the RF transmitter 102 and thus generate, from antenna 104, an RF signal burst containing the received location code AC and the PIN number associated with the IR portable device.

Figure 9:
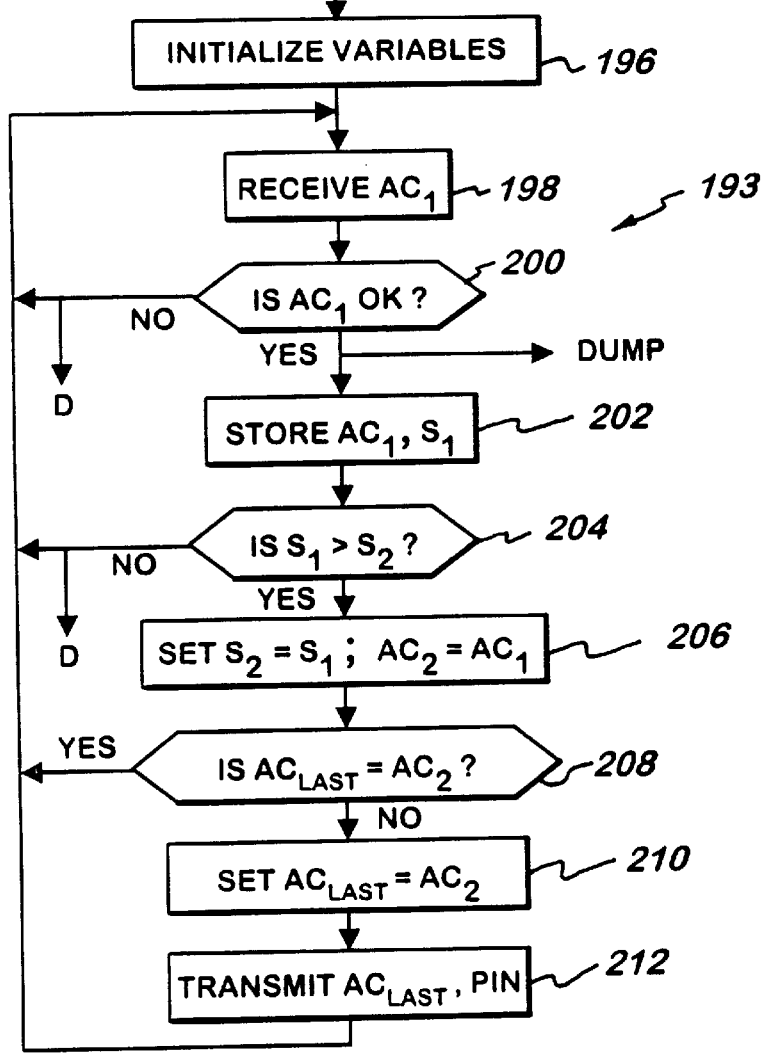
FIG. 9 is a flow chart for the operation of a microprocessor used in an ASK IR transceiver technique as shown in FIG. 8.

The microprocessor 178 proceeds through a routine 193, shown in FIG. 9, for controlling the network of FIG. 8 and determining changes in the location codes associated with detected beacon signals, with each detected beacon signal being sampled and successive samples being compared.

After a start at step 194 and initializing of variables at 196 in FIG. 9, data is continually received at 198, using a suitable interrupt procedure. A test is made at 200 whether the entered location data (AC) is valid. A validity determination is made from an analysis of the associated error correction code. If the data is not valid a return is made to the start of step 198 until valid beacon data is received. Valid data is stored at 202 together with the location code $AC_1$ associated with the beacon signal data and the digital sample S1, indicative of the intensity of the IR signal incident on the photo diode 75, and related to this location code.

A comparison test is then done at 204 as to whether the just received sample amplitude, $S_1$ is greater or less than a previous sample $S_2$. If not, a return is made to step 198. If so, however, then the variable $S_2$ is set equal to S1 and the location code variable $AC_2$ is set equal to $AC_1$ at 206. A test is then made at 208 as to whether the most recent value for the location code, $AC_{last}$ is the same as $AC_2$. If so, then a return is made to step 198 because there is no change in location for the IR portable device. However, if a change in the location code is determined then the value of $AC_{last}$ is set equal to $AC_2$ at 208 and an RF transmission of the PIN and location codes is made at 212. The technique described in connection with FIGS. 8 and 9 may incorporate some or all of the features described with reference to previous Figures.

With the technique of FIGS. 8 and 9 it is possible to detect a change in position of a portable transceiver from a comparison of subsequent amplitude signals S while the location code from the received IR transmission remains the same. The change in amplitude could arise from other factors, such as the occurrence of a different IR signal travel path. However, the sensitive amplitude comparison in most cases can be attributed to, and thus recognized at the central station, that a change in location has occurred for a particular IR portable device.

The techniques of FIGS. 5 through 9 enable a prompt determination when an IR portable device has changed its location and provide a high level of sensitivity to slight differences in the amplitudes of infrared signals from different but nearby IR transmitters. Hence, a more prompt indication that an IR portable device has moved is obtained and when this is associated with the detection of a new location code from another stationary transmitter the central station can be promptly informed with an RF transmission.

Other variations can be implemented, it being understood that the embodiments described herein are for illustration of the invention. For example, the circuit for the comparison of subsequent amplitude samples of the IR incident on a portable device can be done with discrete logic. For an ASK type of communication such logic would include a pair of sample and hold circuits which are sequenced so that their respectively stored values can be compared to determine the occurrence of a change in the location of an IR portable device. The use of flow charts as shown herein are intended to illustrate both an apparatus and a method of the invention. The embodiments are thus illustrative of the techniques as would occur to one skilled in the art after having learned of this invention.

As previously mentioned the preferred embodiment involves the placement of the RF/IR transceiver on the portable side. A reversal of the functions in the stationary and portable devices can be implemented. With the embodiment of FIGS. 8 and 9, the stationary units 170 may include transceivers with IR receivers and RF transmitters and the portable devices 172 include movable IR beacons. In such case the IR beacons should not transmit a continuous FM IR signal, since this would lead to interference problems when several portable devices are near the same stationary transceiver. Instead, the portable IR beacons could send out short bursts of ASK IR carrier signals with the PIN codes and repeated at different intervals and operate in the previously described ASK mode.

What is claimed is:

1. A system for determining the location and the identity of a device or person in an enclosure, comprising:

a plurality of stationary infrared transmitters distributed in various zones within the enclosure, each of said transmitters including means for generating an infrared location code signal representative of the location of the associated transmitter within the enclosure;

a plurality of portable transceivers each being formed of an infrared receiver responsive to detect infrared location code signals from stationary infrared transmitters, means for generating a PIN signal representative of the person or device with which the portable transceiver is associated, and an RF transmitter to generate bursts of an RF output signal representative of the PIN code and the detected location code signal for detection by a remote RF receiver and use at a central station.

2. The system as claimed in claim 1 wherein said stationary infrared transmitters transmit said infrared code signals in the form of frequency modulation with a substantially continuously transmitted infrared carrier and wherein said infrared receiver includes an FM receiver having a sufficient capture ratio so as to enhance the FM receivers sensitivity in discriminating between infrared signals from different infrared transmitters.

3. The system as claimed in claim 1 and further including: transmitter control means within said portable transceiver and responsive to a received location code for refraining from sending an RF transmission to the remote RF receiver when the portable transceiver has not changed its location and for sending a said RF transmission when the portable transceiver has changed its location.

4. The system as claimed in claim 3 wherein said transmitter control means in said portable transceiver comprises:

means for storing a previously received location code signal;

means for storing a subsequent received location code signal; and means for comparing said previous and subsequent location code signals and producing a comparison signal indicative thereof, with said comparison signal being effectively coupled to said RF transmitter for the generation of a said RF transmission when the comparison signal is indicative that the subsequent location code signal is not the same as said previous location code signal.

5. The system as claimed in claim 1 and further including:

means, within said portable transceiver, for detecting when a said infrared transmission from a stationary transmitter has not been received within a predetermined time period and producing a second code signal indicative thereof; and means for RF transmitting said second code signal with said PIN code to said remote RF receiver.

6. The system as claimed in claim 1 wherein said RF transmitters at the portable transceivers generating said bursts of RF output signals at a common carrier frequency.

7. The system as claimed in claim 1 wherein the plurality of infrared transmitters generate respective location code signals at regular intervals and wherein said RF transmitters include means for generating said RF output signals at intervals selected to reduce Interferences between RF output signal bursts from different RF transmitters at the remote RF receiver.

8. The system as claimed in claim 1 wherein said portable transceivers each comprise an infrared detector for producing an electrical location code signal representative of the infrared code signal from a stationary infrared transmitter, storage means for storing a said pin signal, means for combining said electrical location code signal and said stored pin signal into a modulation signal, and means for modulating an RF carrier with said modulation signal.

9. The system as claimed in claim 1 wherein said RF transmitters include means for generating said RF output signals at a common carrier signal at repetition rates that are different for respective RF transmitters.

10. A method for determining the location and identity of a person or equipment within a facility comprising the steps of:

transmitting infrared location signals respectively associated with predetermined zones within the facility;

detecting the infrared location signals at portable devices associated with a person or equipment and re-transmitting the detected location signals from the portable devices in RF signal bursts;

combining the RF re-transmission of location signals with personal identification code signals respectively associated with individual ones of the portable devices;

whereby a determination can be made at a remote location in which zone of the facility the person or equipment is located.

11. The method as claimed in claim 10 and further including the step of delaying said RF transmission until a subsequently detected location signal is indicative of a change of the position of said portable device relative to a previously detected location signal for the portable device.

12. The method as claimed in claim 11 wherein said delaying step further includes the step of delaying said RF transmission until a said IR location signal has not been received for a predetermined interval.

13. The method as claimed in claim 10 and further comprising the steps of:

storing a previously received location signal in the portable device;

comparing a subsequently received location signal with the stored previous location signal; and RF transmitting the subsequently received location signal with the personal identification code signals when the comparing step indicates that the subsequently received location signal is different from the previous location signal while refraining from said RF transmitting step when the comparing step indicates that the subsequent and first location signals represent the same zone.

14. The method as claimed in claim 11 and further including the steps of:

determining within a said portable device when an IR location signal has not been detected for a predetermined interval and generating a first code signal indicative thereof; and RF transmitting said first code signal and the personal identification code signal, associated with the portable device for which a first code signal has been generated, to s aid remote location.

15. A system for generating a signal representative of the location and identity of a device or person in an enclosure, comprising:

a plurality of portable infrared transmitters distributed in the enclosure, each of said infrared transmitters including means for generating a PIN signal representative of the person or device with which the portable infrared transmitter is associated so that the infrared transmitter produces an infrared PIN code signal indicative thereof in common IR carrier frequency bursts;

a plurality of stationary transceivers distributed in various zones within the enclosure, each transceiver being formed of an infrared receiver to detect an infrared PIN code signal from a portable infrared transmitter, means for measuring and storing the signal strength of each such received IR carrier frequency bursts, means for generating a location code signal representative of the zone in which the associated stationary transceiver is located within the enclosure, and an RF transmitter to generate RF output signal bursts and representative of the detected infrared PIN signal from an infrared transmitter and the location code signal for detection by a remote RF receiver.

16. The system as claimed in claim 15 wherein said portable infrared transmitters transmit said infrared PIN signals in the form of frequency modulation with short bursts of transmitted modulated infrared carrier.

17. The system as claimed in claim 15 and further including:

transmitter control means within said stationary transceiver and responsive to a received PIN code for not sending an RF transmission to the remote RF receiver when the portable transmitter has not changed its zone location and for sending a said RF transmission when the portable transmitter has changed its zone location.

18. The system as claimed in claim 15 wherein said RF output signal bursts from the RF transmitters are at a common carrier frequency and means in said RF transmitters for generating said RF output signals at intervals selected to reduce interferences between RF output signal bursts at the remote RF receiver from different RF transmitters.

19. A system for providing a signal representative of the location and identity of a device or person in an enclosure to a central processor, comprising:

a plurality of stationary infrared transmitters distributed in the enclosure, each of said transmitters including means for repeatedly generating an infrared location code signal which is FM modulated onto an IR carrier and is representative of the location of the associated transmitter within the enclosure;

a plurality of portable transceivers each being formed of an infrared receiver having an FM receiver section so as to detect an infrared location code signal from a stationary infrared transmitter, means for generating a PIN signal representative of the person or device with which the portable transceivers are associated, means for repeatedly producing a modulation signal representative of said infrared code and said PIN signal, and an RF transmitter having means for generating an RF carrier signal and means for applying said modulation signal to modulate said RF carrier for detection by a remote RF receiver of said infrared code and said PIN signal, whereby location and identification information is remotely collected with infrared communication and transferred via RF to the central processor.

20. A system for providing a signal representative of the location and identity of a device or person in an enclosed area to a central processor, comprising:

a plurality of portable infrared transmitters distributed in the enclosure, each of said infrared transmitters including a PIN signal generator representative of the person or device with which the portable transmitter is associated so that the infrared transmitter produces an infrared PIN code signal indicative thereof;

a plurality of stationary selectively placed transceivers, each being formed of an infrared receiver responsive to detect an infrared PIN code signal from a portable infrared transmitter, means for generating a location code signal representative of the location of the associated stationary transceiver and an RF transmitter having means for generating an RF carrier signal, means for producing a modulation signal representative of the detected infrared PIN signal from an infrared transmitter and the location code signal, and means for modulating the RF carrier signal with the modulation signal for detection by a remote RF receiver, whereby location and identification information is remotely collected with infrared communication and transferred via RF to the central processor.

21. A system for determining the location and the identity of a device or person in an enclosure, comprising:

a plurality of stationary infrared transmitters distributed in various zones within the enclosure, each of said transmitters including means for generating an infrared location code packet representative of the location of the associated transmitter within the enclosure; each of said infrared transmitters transmitting infrared location code packets in the form of frequency modulation with a substantially continuously transmitted infrared carrier and continuously repeated location code;

a plurality of portable transceivers each being formed of an infrared receiver responsive to detect infrared location code packets from stationary infrared transmitters, and wherein said infrared receiver includes an FM receiver having a sufficient capture ratio so as to enhance the receiver's capability in isolating and selecting the stronger of incident infrared signals from different infrared transmitters;

means within the portable transceiver to enter a sleep mode during which battery current drain is significantly reduced; an internal timer for leaving the sleep mode so as to enable the portable transceiver to receive a subsequently available infrared code packet, means for generating a PIN code signal representative of the person or device with which the portable transceiver is associated, and an RF transmitter to generate bursts of an RF output signal representative of the PIN code and the detected location code signal for detection by a remote RF receiver and use at a central station; and an RF transmission controller responsive to detected location code signals for determining whether an RF portable device remains in place or has changed its location; so as to delay sending an RF transmission burst to the remote RF receiver when the portable remains in place and for sending a said RF transmission burst when the portable device has changed its location.

22. A method for determining the location and identity of a person or equipment within a facility comprising the steps of:

transmitting infrared location signals as repeated FM packets respectively associated with predetermined zones within the facility;

placing portable devices having infrared receivers periodically in idle and awakened modes during which the infrared receivers can detect location codes in incident FM location packets;

determining whether the detected location signal in an FM packet represents a change in location of the portable device;

transmitting the detected location signals from the portable devices in RF signal bursts together with personal identification code signals respectively associated with individual ones of the portable devices when a change in location of a portable device has been determined;

whereby a determination can be made at a remote location in which zone of the facility the person or equipment is located with battery powered infrared portable devices requiring low battery power drain.

* * * * *